(12) United States Patent
Gijare et al.

(10) Patent No.: US 11,049,178 B2
(45) Date of Patent: Jun. 29, 2021

(54) OFFER AND ACCEPTANCE MATCHING TO OBTAIN PHYSICAL CASH

(71) Applicant: Mastercard International Incorporated, Purchase, NY (US)

(72) Inventors: Ashutosh Subhash Gijare, Pune (IN); Krishna Prasad Vasireddy, Pune (IN); Moreshwar Mukund Datye, Pune (IN); Rahul Agrawal, Pune (IN); Sudhir Gupta, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 164 days.

(21) Appl. No.: 16/141,207

(22) Filed: Sep. 25, 2018

(65) Prior Publication Data
US 2019/0197610 A1  Jun. 27, 2019

(30) Foreign Application Priority Data
Dec. 22, 2017  (SG) .......................... 10201710755Q

(51) Int. Cl.
*H04L 9/32*   (2006.01)
*G06Q 20/38*  (2012.01)
(Continued)

(52) U.S. Cl.
CPC ......... *G06Q 30/08* (2013.01); *G06Q 20/3224* (2013.01); *G06Q 20/382* (2013.01);
(Continued)

(58) Field of Classification Search
CPC ...... G06Q 20/10; G06Q 20/381; G06Q 30/08; G06Q 40/04; G06Q 30/0214;
(Continued)

(56) References Cited

U.S. PATENT DOCUMENTS

| | | | |
|---|---|---|---|
| 2011/0251906 A1* | 10/2011 | Loevenguth | G06Q 20/40145 705/16 |
| 2013/0166454 A1* | 6/2013 | Bulawa | G06Q 20/102 705/44 |

(Continued)

FOREIGN PATENT DOCUMENTS

CA      2416550 A1 *  11/2001  ............. G06Q 30/06

OTHER PUBLICATIONS

Thomas Meyer. The power of people: Online P2P lending nibbles at banks' loan business. E-Banking Snapshot 22. Deutsche Bank Research. Jul. 2007. (Year: 2007).*

*Primary Examiner* — Virpi H Kanervo
(74) *Attorney, Agent, or Firm* — Talem IP Law, LLP

(57) ABSTRACT

According to a first aspect, there is provided an offer-and-acceptance matching server comprising: at least one processor; at least one memory including computer program code; and a communication port coupled to the processor the at least one memory and the computer program code configured to, with the at least one processor, cause the offer-and-acceptance matching server at least to: receive, through the communication port, a query to determine deals for fund offer, fund acceptance, or both, available within a provided distance; interrogate a database to determine one or more fund offer deals, one or more fund acceptance deals, or both that match the query, the database containing records of such deals registered with the database; and respond, through the communication port, to the query with the deals that are within the provided distance.

15 Claims, 9 Drawing Sheets

(51) Int. Cl.
*G06Q 20/40* (2012.01)
*G06Q 20/32* (2012.01)
*G06Q 30/08* (2012.01)
*G06Q 40/04* (2012.01)
*G06Q 30/02* (2012.01)

(52) U.S. Cl.
CPC ..... *G06Q 20/4014* (2013.01); *G06Q 30/0214* (2013.01); *G06Q 40/04* (2013.01); *H04L 9/3215* (2013.01); *H04L 9/3226* (2013.01); *H04L 9/3228* (2013.01); *H04L 2209/56* (2013.01)

(58) Field of Classification Search
CPC ............. G06Q 20/382; G06Q 20/4014; G06Q 20/3224; G06Q 20/108; H04L 9/3226
See application file for complete search history.

(56) References Cited

U.S. PATENT DOCUMENTS

| | | | |
|---|---|---|---|
| 2013/0282561 A1* | 10/2013 | Runkle | G06Q 20/10 705/39 |
| 2017/0091720 A1* | 3/2017 | Dass | G06Q 40/02 |

\* cited by examiner

OFFER AND ACCEPTANCE MATCHING TO OBTAIN PHYSICAL CASH

CROSS-REFERENCE TO RELATED APPLICATION

This application is a U.S. National Stage filing under 35 U.S.C. § 119, based on and claiming benefits of and priority to Singapore Patent Application No. 10201710755Q filed on Dec. 22, 2017. The entire disclosure of the above application is incorporated herein by reference for all purposes.

TECHNICAL FIELD

The following discloses a device and method that allows users to obtain cash even when there is no nearby ATM (automated teller machine) or when a nearby ATM is unable to dispense cash.

BACKGROUND

While there is a drive to move into a cashless society, there will still be a need for cash. For instance, there are places or occasions where cash is required, since not everyone is savvy with cashless payments.

In such circumstances, where cash is needed, an ATM may not be around or a nearby ATM has run out of cash or is unable to dispense cash due to a network error.

There is thus a need to address the above shortcomings. Other desirable features and characteristics will become apparent from the subsequent detailed description and the appended claims, taken in conjunction with the accompanying drawings and this background of the present disclosure.

SUMMARY OF THE INVENTION

According to a first aspect, there is provided an offer-and-acceptance matching server comprising: at least one processor; at least one memory including computer program code; and a communication port coupled to the processor the at least one memory and the computer program code configured to, with the at least one processor, cause the offer-and-acceptance matching server at least to: receive, through the communication port, a query to determine deals for fund offer, fund acceptance, or both, available within a provided distance; interrogate a database to determine one or more fund offer deals, one or more fund acceptance deals, or both that match the query, the database containing records of such deals registered with the database; and respond, through the communication port, to the query with the deals that are within the provided distance.

According to a second aspect, there is provided an offer-and-acceptance matching server comprising: at least one processor; at least one memory including computer program code; and a communication port coupled to the processor the at least one memory and the computer program code configured to, with the at least one processor, cause the offer-and-acceptance matching server at least to: receive, through the communication port, a query to determine deals for fund offer, fund acceptance, or both; interrogate a database to determine one or more fund offer deals, one or more fund acceptance deals, or both that match the query, the database containing records of such deals registered with the database; respond, through the communication port, to the query with the deals that match the query; receive, through the communication port, an indication of a deal selected by a consenter from the deals retrieved in the response; transmit, through the communication port, a notification of the selection to a party who registered the selected deal; transmit, through the communication port, a generated authentication code to either the consenter or the party who registered the selected deal; receive, through the communication port, an authentication code from the other of the consenter or the party who registered the selected deal; compare the received authentication code against the generated authentication code for a match; and transmit, in the event of a match, a command through the communication port to effect cash flow, of an amount stipulated in the selected deal, between a fund account linked to the consenter and a fund account linked to the party who registered the selected deal.

According to a third aspect, there is provided an offer-and-acceptance matching server comprising: at least one processor; at least one memory including computer program code; and a communication port coupled to the processor the at least one memory and the computer program code configured to, with the at least one processor, cause the offer-and-acceptance matching server at least to: receive a request to register a fund acceptance deal or a fund offer deal; detect for presence of at least a stipulated amount and a commission for acceptance of the deal; register the deal with a database in response to affirmative detection of the fund amount and the commission figure; receive, through the communication port, a query to determine deals for fund offer, fund acceptance, or both; interrogate the database to determine the registered fund offer deal, the registered fund acceptance deal, or both that match the query; respond, through the communication port, to the query with the deals that match the query; and receive, through the communication port, an indication of a deal selected by a consenter from the deals retrieved in the response.

According to a fourth aspect, there is provided an offer-and-acceptance matching method comprising receiving a query to determine deals for fund offer, fund acceptance, or both, available within a provided distance; interrogating a database to determine one or more fund offer deals, one or more fund acceptance deals, or both that match the query, the database containing records of such deals registered with the database; and responding to the query with the deals that are within the provided distance.

According to a fifth aspect, there is provided an offer-and-acceptance matching method comprising receiving a query to determine deals for fund offer, fund acceptance, or both; interrogating a database to determine one or more fund offer deals, one or more fund acceptance deals, or both that match the query, the database containing records of such deals registered with the database; responding to the query with the deals that match the query; receiving an indication of a deal selected by a consenter from the deals retrieved in the response; transmitting a notification of the selection to a party who registered the selected deal; transmitting a generated authentication code to either the consenter or the party who registered the selected deal; receiving an authentication code from the other of the consenter or the party who registered the selected deal; comparing the received authentication code against the generated authentication code for a match; and transmitting, in the event of a match, a command to effect cash flow, of an amount stipulated in the selected deal, between a fund account linked to the consenter and a fund account linked to the party who registered the selected deal.

According to a sixth aspect, there is provided an offer-and-acceptance matching method comprising receiving a request to register a fund acceptance deal or a fund offer deal; detecting for presence of at least a stipulated amount and a commission for acceptance of the deal; registering the deal with a database in response to affirmative detection of the fund amount and the commission figure; receiving a query to determine deals for fund offer, fund acceptance, or both; interrogating the database to determine the registered fund offer deal, the registered fund acceptance deal, or both that match the query; responding to the query with the deals that match the query; and receiving an indication of a deal selected by a consenter from the deals retrieved in the response.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to illustrate various embodiments and to explain various principles and advantages in accordance with a present embodiment, by way of non-limiting example only.

Embodiments of the invention are described hereinafter with reference to the following drawings, in which.

DETAILED DESCRIPTION

Overview

Figure 1:
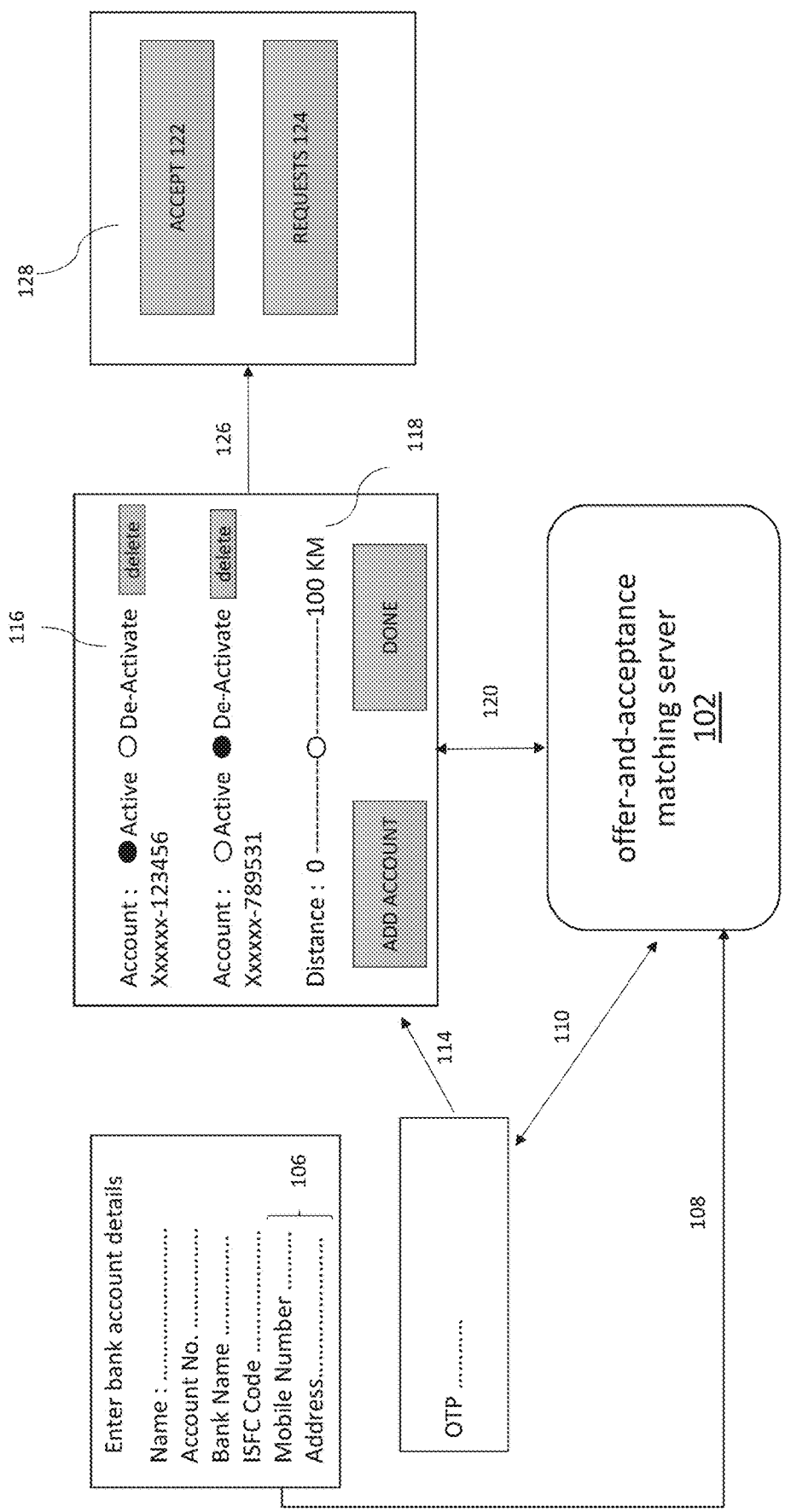
FIG. 1 shows the operation of an offer-and-acceptance matching server during a user registration phase.

Various embodiments of present disclosure provide a method and a system that allows for users to obtain funds or cash even when there is no nearby ATM (automated teller machine) or when a nearby ATM is unable to dispense cash.

The need for an ATM to obtain cash is eliminated through a server that matches a party that is willing to offer cash to a party that requires cash. This server is referred to as "an offer-and-acceptance matching server" in the following disclosure because this server seeks to find a consenter for the party offering cash; and a consenter for the party requiring cash. The party that is offering cash, as part of a cash offer deal, is referred to as a seller, while the party that requires cash, as part of a cash acceptance deal, is referred to as a purchaser. When the seller and the consenter (being in this case, the purchaser) meet, their identities are verified through the use of an authentication code administered by the offer-and-acceptance matching server. Similarly, when the purchaser and the consenter (being in this case, the seller) meet, their identities are verified through the use of an authentication code administered by the offer-and-acceptance matching server. The successful identity verification causes the offer-and-acceptance matching server to complete the deal between the seller/purchaser and the consenter by facilitating fund flow between the seller's/purchaser's account to the consenter's account, the fund flow being an amount that at least covers the physical cash amount of the cash offer/acceptance deal.

The parties that wish to avail themselves to the matching service provided by the offer-and-acceptance matching server register their respective requests with the offer-and-acceptance matching server. For instance, the request that a seller registers is an offer to provide a stipulated amount of funds, while the request that a purchaser registers is a stipulated amount of funds that is required. The registered request to provide cash is interchangeably referred to as a fund offer deal, while the registered request for required cash is interchangeably referred to as a fund acceptance deal. Registered deals are stored in a database by the offer-and-acceptance matching server. Registration serves to advertise the deals that the sellers and the purchasers are willing to enter, whereby these deals become known when the database is accessed.

This database is accessed when the offer-and-acceptance matching server receives a query to determine the fund offer deals and the fund acceptance deals made available through the above mentioned registration. Such a query may be sent by a user who is in need of funds; or the user that sent the query may want to determine whether they can provide funds to any other party that needs funds. To ensure that the user making the query does not have to sift through all registered deals, the query performs filtering by only retrieving deals that are in proximity to the location of the user. This proximity is determined by a distance that the user provides either at the time of making the query or is part of a pre-defined setting which is changeable.

When one of the registered deals is selected, contact details (such as an email address, a mobile number or a social media account) is shared between the user making the query (who becomes the consenter) and the party who registered the selected deal, such that one or both obtains the contact details of the other. Thus, the following scenarios are possible: only the consenter will receive the contact details of the seller or the purchaser; only the seller or the purchaser will receive the contact details of the consenter; or the seller or the purchaser of the selected deal will receive the contact details of the consenter and the consenter will receive the contact details of the seller or the purchaser. As an additional layer of security, the offer-and-acceptance matching server sends an authentication code to either the seller/purchaser or the consenter. Upon receipt of the same authentication code, the offer-and-acceptance matching server completes the deal by facilitating fund flow between the consenter's account and the seller's/purchaser's account that covers the cost of the selected fund offer or fund acceptance deal.

The party that is offering cash is referred to as the seller also because there is profit to be made when their fund offer deal is selected. This profit is reflected as a transaction percentage for each fund offer deal, which uses the amount of funds offered as its base. Similarly the party that requires cash is referred to as the purchaser also because they incur cost when their fund acceptance deal is selected. This cost is reflected as a transaction percentage for each fund acceptance deal, which uses the amount of funds required as its base. This transaction percentage thus serves as a commission applied on each fund offer deal or fund acceptance deal, whereby the commission provides motivation to the seller from being able to make money, while the purchaser pays for the convenience of having an alternative source of cash when an ATM is unable to dispense money or when there is no nearby ATM. This commission is factored in when the offer-and-acceptance matching server facilitates the fund flow between the consenter's account and the seller's/purchaser's account.

The present disclosure thus provides a solution that allows cash to be obtainable when an ATM is unable to dispense cash through providing a platform that allows identification of a party that can provide the required cash and exchanging of contact details that allow for the party that can provide cash to meet the party that requires the cash. A seller that requests the least commission for the required cash amount or a seller that is nearest can be selected.

TERMS DESCRIPTION (IN ADDITION TO DICTIONARY MEANING OF TERMS)

An offer-and-acceptance matching server refers to any one or more server terminals that administers a program that matches a party that is willing to offer cash to a party that needs cash. The offer-and-acceptance matching server allows access to a database that keeps records of deals of the cash offer (also referred to as "fund offer deals") and deals of the cash requirement (also referred to as "fund acceptance deals").

A query refers to a command to initiate a sequence of steps that uncover what deals are registered in a database that stores fund offer deals and fund acceptance deals. In one implementation, the query also includes parameters that filter the returned results, such as the deals being made by a party that is in proximity to within a provided distance, such as proximate to the immediate location of a party making the query or in the vicinity of a location that the party making the query will arrive at a later time. Another additional parameter includes excluding deals that charge a commission above a certain percentage level.

A deal for a fund offer or a fund offer deal refers to a transaction made a party that is offering cash. A deal for a fund acceptance or a fund acceptance deal refers to a transaction made a party that requires cash.

The party that makes the fund offer deal is referred to as a seller, while the party that makes the fund acceptance deal is referred to as a purchaser.

A consenter refers to a user who agrees to either the seller's fund offer deal or the purchaser's fund acceptance deal. When the consenter agrees to a deal where funds are available (or being sold), the consenter becomes a purchaser. When the consenter agrees to a deal where funds are required (or being purchased), the consenter becomes a seller.

Deals that match the query refer to one or more registered fund acceptance deals or registered fund acceptance deals that meet the requirements of the query.

A response to a query refers to deals that are retrieved from the database after the query is processed.

Contact details refer to one or means to connect with the seller or the purchaser, such as an email address, a mobile number or a social media.

Exemplary Embodiments

Embodiments of the present invention will be described, by way of example only, with reference to the drawings. Like reference numerals and characters in the drawings refer to like elements or equivalents.

Figure 2:
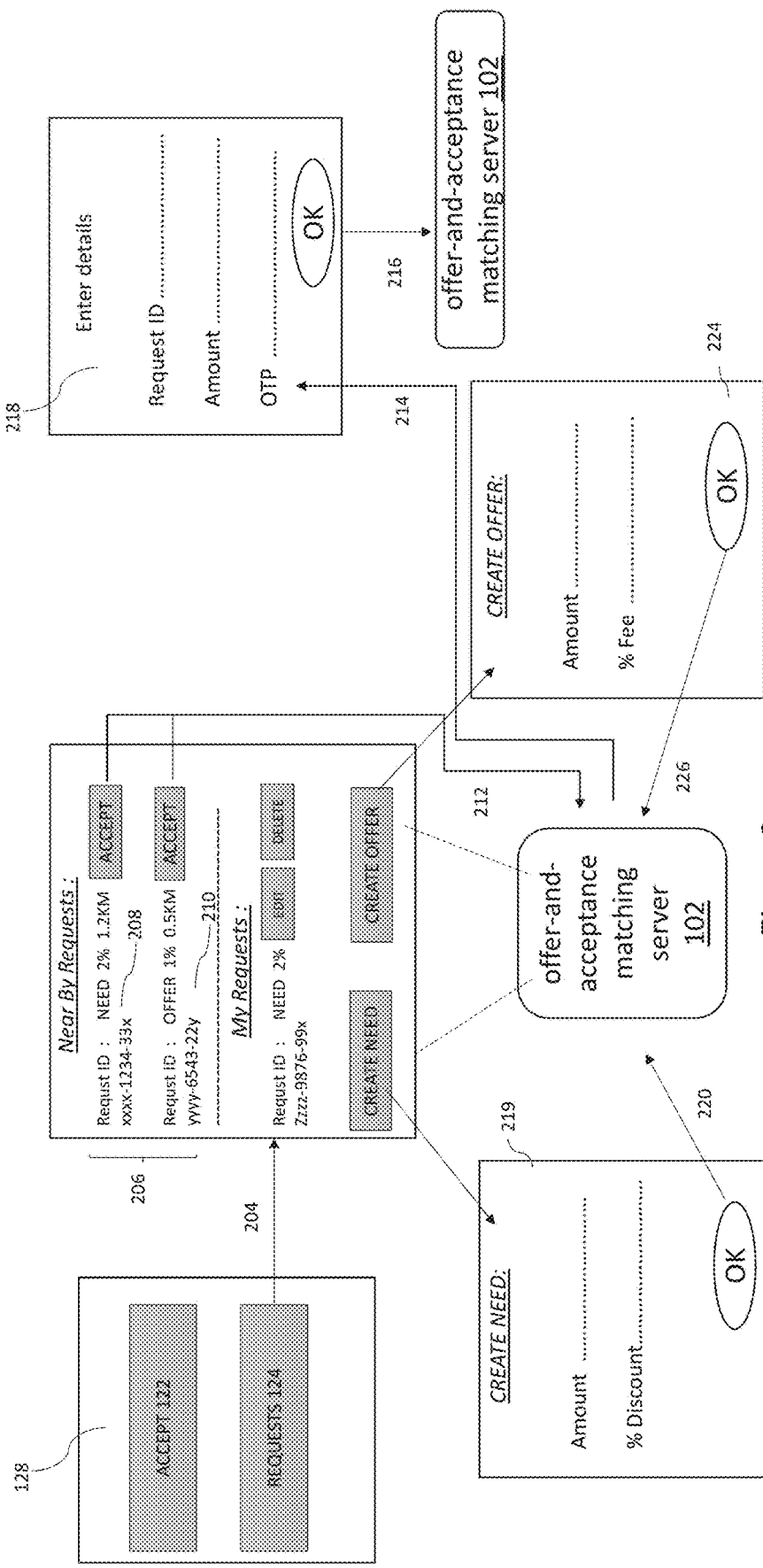
FIG. 2 shows the operation of the offer-and-acceptance matching server of FIG. 1 during deal enquiry and deal acceptance phases.
Figure 3:
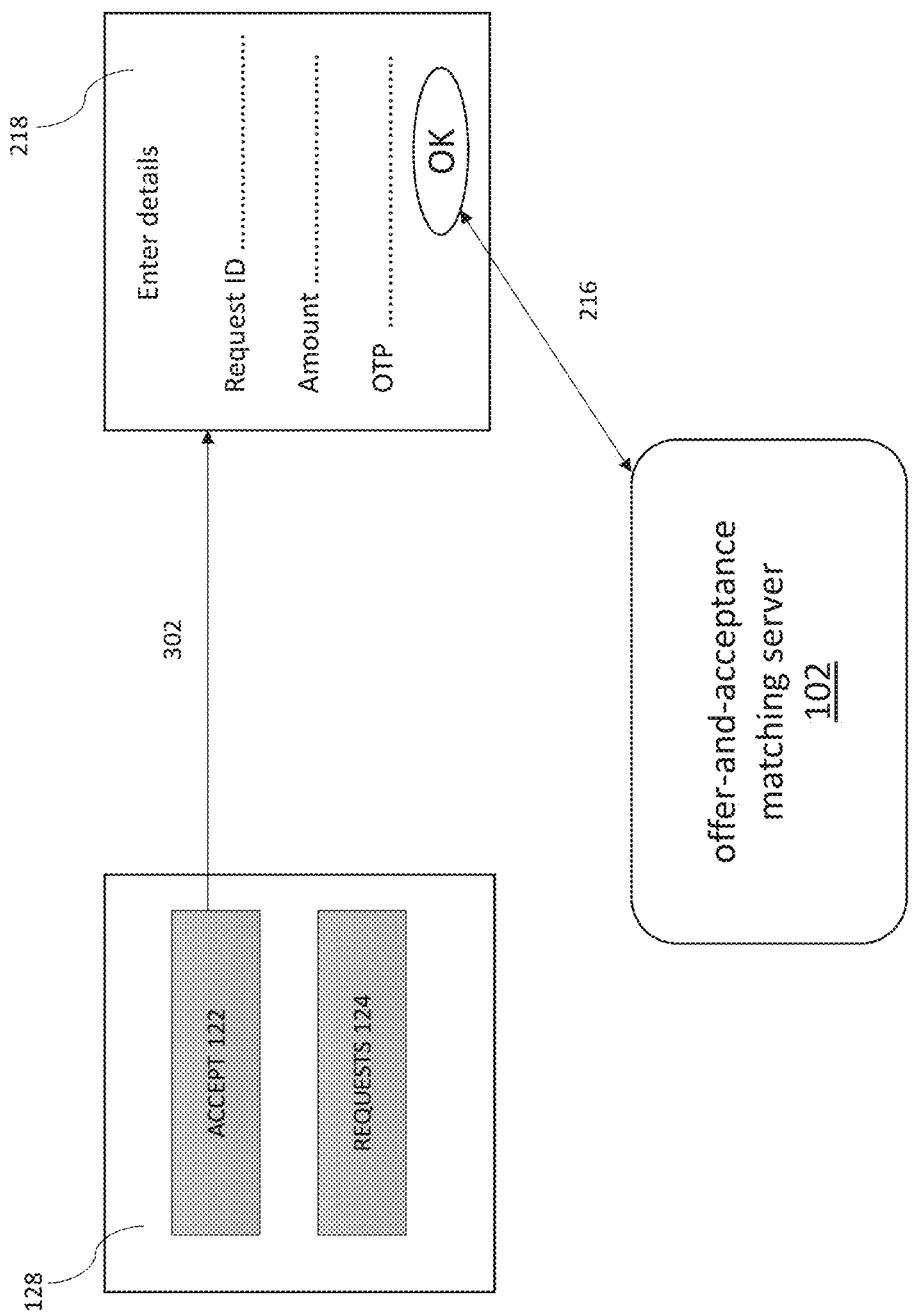
FIG. 3 shows the operation of the offer-and-acceptance matching server of FIG. 1 during a deal acceptance phase.

FIGS. 1 to 3 each show a schematic data flow sequence of various stages of operation of an offer-and-acceptance matching server 102, programmed in accordance with one embodiment of the present invention, to match a party that is willing to offer cash (i.e. a seller) to a consenter who agrees to the cash offer; and to match a party that needs cash (i.e. a purchaser) to a consenter who agrees to provide the cash.

The matching service provided by the offer-and-acceptance matching server 102 is accessed through, for example, a suitably configured application (hereafter referred to as "the interfacing application") installed in a computing device (not shown) that the seller, the purchaser and the consenter respectively uses to communicate with the offer-and-acceptance matching server 102. The computing device may, for example, be a smart phone having an operating system. The operating system hosts one or more mobile applications, including the interfacing application that is configured to communicate with the offer-and-acceptance matching server 102.

For the sake of simplicity, it will be appreciated that any mention of the seller, the purchaser and the consenter refers to the computing device that the seller uses to access the offer-and-acceptance matching server 102, the computing device that the purchaser uses to access the offer-and-acceptance matching server 102 and the computing device that the consenter uses to access the offer-and-acceptance matching server 102. Instead, each of FIGS. 1 to 3 show screen samples of the electronic device at various stages of the offer-and-acceptance matching server 102 operation.

FIG. 1 shows the operation of the offer-and-acceptance matching server 102 during a user registration phase.

During this registration phase, a user will register one or more bank accounts with the offer-and-acceptance matching server 102 by providing 104 all details of the bank account. If the user is opening an account with the offer-and-acceptance matching server 102, they also have to provide mobile and residential address details 106 that are utilised for their account with the offer-and-acceptance matching server 102, whereby any communication facilitated by the offer-and-acceptance matching server 102 is sent to the mobile number found in these details 106. The mobile number that the user provides to the offer-and-acceptance matching server 102 should be the same as used on the one or more bank accounts registered with the offer-and-acceptance matching server 102.

The bank account details are sent 108 to the offer-and-acceptance matching server 102. The offer-and-acceptance matching server 102 directly, or through another service provider (such as a financial switch of a payment network or a server that belongs to the financial institution to which the selected bank account belongs), cross verifies whether the provided account is valid or not by sending 110 a one-time password (OTP) to a registered mobile number against the bank account number sought to be registered with the offer-and-acceptance matching server 102.

Successful verification of the OTP will lead to inclusion of the bank account number into a list 116 of previously registered bank account numbers, if any. The user can add/delete multiple bank account numbers but only one bank account number is active at transaction time using the interfacing application, i.e. when accepting a fund offer deal or fund acceptance deal, since the active bank account number is used to fund the transaction. The bank account settings will be synchronised with the offer-and-acceptance matching server 102 records and any changes will trigger another OTP 120 for authentication and confirmation.

In the same page, the user will have an option of managing distance 118, i.e. a fund offer deal or a fund acceptance deal has to be made by parties within a certain distance 118 from the user. The offer-and-acceptance matching server 102 will obtain the user's location through the interfacing application accessing, for example, global positioning system (GPS) capability of the user's computing device so as to determine deals made by parties that are within the specified distance 118. The user can change this distance 118. A greater distance would provide more options of locating parties that have registered deals of either accepting or offering cash using the interfacing application. Although not shown, it is also possible that an address that the user will be at when they want to enter into a transaction can be entered, so that advance notice of deals available is known before arriving at the address.

With bank account and distance settings configured, the user will be directed 126 to a default page 128 that contains two options: Accept 122 and Requests 124. Details of the workings of the Accept 122 and Requests 124 options are described below with reference to FIGS. 2 and 3.

FIG. 2 shows the operation of the offer-and-acceptance matching server 102 during deal enquiry and deal acceptance phases.

Starting from the default page 128, the user who wishes to discover available deals select the Requests 124 option. This causes the offer-and-acceptance matching server 102 to receive a query 204 to determine deals for fund offer, fund acceptance, or both. These deals are those available within the provided distance 118 set by the user as explained above with reference to FIG. 1.

A database (not shown) is interrogated to determine one or more fund offer deals, one or more fund acceptance deals, or both that match the query. This database contains records of such deals registered with the database. The database is either integrated with the offer-and-acceptance matching server 102 or is hosted in an external terminal. The offer-and-acceptance matching server 102 then responds to the query 204 with the one or more fund offer bids, the one or more fund acceptance bids, or both that are within the provided distance 118. A graphical layout may be used when the query 204 is received and also to display the response to the query 204, as shown and described later with reference to FIGS. 4A and 4B.

In FIG. 2, data from the response is organised into separate entries 206 under an appropriate heading conveying that its content relates to retrieved registered deals. A partial identifier for each retrieved deal is shown and the distance between the party who registered the deals and the user is shown. FIG. 2 shows that a fund acceptance deal 208 and a fund offer deal 210 have been retrieved. The nature of the deal is indicated, i.e. whether it is a NEED request (means that the party making the deal needs cash) or an OFFER request (means that the party wants to provide cash). Each retrieved deal also lists a % figure, which means how much discount or fee is applicable for the respective deal. In the case of the fund acceptance deal 208, the 2% figure means that the purchaser is giving a 2% discount, i.e. if $100 is required by the purchaser, $102 will be reimbursed from the purchaser's account into the account of the user who accepts the fund acceptance deal 208. Similarly, for the fund offer deal 210, the 1% figure means that the seller is charging a 1% fee, i.e. when the seller's offer of $100 is accepted, $101 will be reimbursed from the user who accepts the fund offer deal 210 into the seller's account.

The following discusses the operation of the offer-and-acceptance matching server 102 when the user selects a deal from the entries 206. As mentioned above, when the user agrees to a fund offer deal registered by a seller or a fund acceptance deal registered by a purchaser, the user becomes a consenter to the selected deal. When the offer-and-acceptance matching server 102 receives 212 an indication of a deal selected by a consenter from the deals retrieved in the response to the query 204, a notification is transmitted to the party who registered the selected deal. Thus, if the consenter selects the fund acceptance deal 208, the purchaser of the fund acceptance deal 208 is notified, while if the consenter selects the fund offer deal 210, the seller of the fund offer deal 210 is notified. This notification serves to inform the relevant party who has registered the selected deal on the database managed by the offer-and-acceptance matching server 102 that their deal has been selected. Alternatively, or in addition, the notification of the selection is transmitted to the consenter, as acknowledgement from the offer-and-acceptance matching server 102, where this acknowledgement provides contact details of the party who registered the selected deal so that the consenter can initiate contact with this party. Such an alternative notification occurs, for example, when privacy settings are such that the consenter wishes to control when their selection is made known to the party who registered the selected deal.

The offer-and-acceptance matching server 102 also provides the consenter with contact details of the party who registered the selected deal; provides; the party who registered the selected deal with contact details of the consenter; or both (i.e. the party who registered the selected deal receives the contact details of the consenter and the consenter receives the contact details of the party who registered the selected deal). For example, a short message service (SMS) is sent to the consenter on the mobile number registered provided as part of the details 106 (confer above description from FIG. 1) during registration, the SMS containing any one or more of a mobile number, an email address or a social media account of the party who registered the selected deal. Similarly, a SMS is sent to the mobile number of the party who registered the selected deal, the SMS containing any one or more of a mobile number, an email address or a social media account of the consenter. Other than SMS, the offer-and-acceptance matching server 102 sends the contact details in other transmission formats, such as application specific format (like an instant messaging application or over the interfacing application that the consenter and the party who registered the selected deal uses to communicate with the offer-and-acceptance matching server 102 the offer-and-acceptance matching server 102) or email. This allows the consenter and the party who registered the selected deal to contact each other and meet to complete the deal transaction.

To minimise fraud, the offer-and-acceptance matching server 102 uses an authentication code to verify the identities of the parties involved during deal transaction completion. The offer-and-acceptance matching server 102 transmits 214 a generated authentication code to either the consenter or the party who registered the selected deal. The offer-and-acceptance matching server 102 then monitors for receipt of an authentication code from the other of the consenter or the party who registered the selected deal. That is, if the generated authentication code is sent to the consenter, then the offer-and-acceptance matching server 102 monitors for receipt of the authentication code from the party who registered the selected deal. On the other hand, if the generated authentication code is sent to the party who registered the selected deal, then the offer-and-acceptance matching server 102 monitors for receipt of the authentication code from the consenter. The received 216 authentication code is compared against the generated authentication code for a match. In the event of a match, a command is transmitted to effect cash flow, of an amount stipulated in the selected deal, between a fund account linked to the consenter and a fund account linked to the party who registered the selected deal. The linked fund account of the consenter refers to the bank account number marked as active in the list 116 of registered bank account numbers (confer above description from FIG. 1). Similarly, the linked fund account of the party who registered the selected deal refers to their active bank account. The generated authentication code may be simultaneously transmitted with the notification to the party who registered the selected deal that their deal has been selected.

In one specific embodiment, the generated authentication code is only transmitted to a party offering the funds in the selected deal, since this is the party undertaking the greater risk in the deal transaction. The offer-and-acceptance matching server 102 then receives the authentication code from a party accepting the funds in the selected deal.

This specific embodiment is realised with reference to the fund acceptance deal 208 and the fund offer deal 210 as follows. For the fund offer deal 210, the generated authentication code is only transmitted to the seller (i.e. the party who registered the fund offer deal 210) and not to the consenter. For the fund acceptance deal 208, the generated authentication code is transmitted to the consenter and not to the purchaser (i.e. the party who registered the fund acceptance deal 208), since the consenter is the one providing funds in the deal transaction.

When the consenter and the party who registered the selected deal meet, the party who did not receive the generated authentication code will ask the other party for the generated authentication code and for their full identifier (confer that only a partial identifier is provided for each of the fund offer deal 210 and the fund acceptance deal 208 fund acceptance deal 208 of the entries 206) data. The full identifier, the generated authentication code and the amount of the selected deal are entered into an input form 218.

A data packet containing these details is transmitted 216 to the offer-and-acceptance matching server 102 when the OK button is pressed for cross verification. Upon successful verification, the offer-and-acceptance matching server 102 will effect the necessary fund transfer between the consenter's fund account and the fund account of the party who registered the selected deal. The money transferring will be done against the active accounts of both the consenter and the party who registered the selected deal. The effected cash flow includes a commission applied on the selected deal.

The user can also register their fund acceptance deal through using a "create need" button. Once the user clicks on this "create need" button, a page 219 will open which will ask the user to enter a requested amount and if there is any discount applied on the requested amount. When the user clicks on an "OK" button, a request 220 will be sent to the offer-and-acceptance matching server 102 and the user's posted fund acceptance deal will then become visible to others accessing the offer-and-acceptance matching server 102. The user then becomes a purchaser of their posted fund acceptance deal. The user's fund acceptance deal 222 can also be seen below the entries 206 of retrieved registered deals. The user can EDIT or DELETE their posted fund acceptance deal at any time. An identifier will also be generated by the offer-and-acceptance matching server 102, which is shown to be partially revealed in FIG. 2.

Similarly, the user can register their fund offer deal through using a "create offer" button. Once the user clicks on this button, a page 224 will open which will ask the user to enter an offered amount and if there is any fee applied on the offered amount. When the user clicks an "OK" button, a request 226 will be sent to the offer-and-acceptance matching server 102 and the user's posted fund offer deal will then become visible to others accessing the offer-and-acceptance matching server 102. Although not shown in FIG. 2, the user's fund offer deal will be placed below the entries 206 of retrieved registered deals. The user can EDIT or DELETE their posted fund acceptance deal at any time. An identifier will also be generated by the offer-and-acceptance matching server 102.

Thus when the offer-and-acceptance matching server 102 receives a request to register a fund acceptance deal or a fund offer deal with a database, the offer-and-acceptance matching server 102 detects for presence of at least a stipulated amount and a commission for acceptance of the deal. For the fund acceptance deal, the commission refers to a discount, since the physical cash that the purchaser receives will be less than the funds amount that the purchaser's account pays to the account of the consenter who agrees with the purchaser's fund acceptance deal. For the fund offer deal, the commission refers to a fee, since the physical cash that the seller provides will be less than the funds amount that the account of the consenter, who agrees with the seller's fund offer deal, pays to the seller's account. The offer-and-acceptance matching server 102 registers the deal with the database in response to affirmative detection of the fund amount and the commission figure.

FIG. 3 shows the operation of the offer-and-acceptance matching server 102 during a deal acceptance phase.

The offer-and-acceptance matching server 102 provides an interface that facilitates deal acceptance, namely the input form 218 described above with respect to FIG. 2. The input form 218 is accessed 302 by selecting the Accept 122 option from the default page 128.

The input form 218 is used when a consenter to a selected deal meets the party who registered the selected deal since it is from the meeting that the full identifier of the selected deal and the generated authentication code are obtained and can then be entered into an input form 218 by the party that is receiving the funds. The identifier of the selected deal is generated at the time of registration of the selected deal. The details of the full identifier, the generated authentication code and the amount of the selected deal are transmitted 216 to the offer-and-acceptance matching server 102 when the OK button is selected. In this approach, the generated authentication code that is used to verify the identities of the parties involved during deal transaction completion is a one-time password (OTP) comprising one or more of text, numbers or symbols.

In another approach, the generated authentication code is an image, such as a barcode or a QR (quick response) code. The QR code may be unique in that a new one is generated for each transaction between a seller and a purchaser, whereby data such as any one or more of the particulars (such as name and address) of the seller or the purchaser, the amount of the transaction, the applied commission on the transaction has an impact on the QR code that is generated. To capture the generated QR code, the input form 218 triggers a command to activate a camera of the computing device (such as a smart phone) operating the input form 218, i.e. the computing device belonging to the consenter of the selected deal. The QR code shown on a screen of the computing device of the party who registered the selected deal is captured by the camera of the computing device belonging to the consenter of the selected deal. The details of the full identifier, the generated authentication code (namely the captured QR code) and the amount of the selected deal are transmitted 216 to the offer-and-acceptance matching server 102 when the OK button is selected.

In both approaches, the offer-and-acceptance matching server 102 will verify the received details and on successful verification, the offer-and-acceptance matching server 102 will effect the necessary fund amount from the relevant bank accounts as mentioned above with respect to FIG. 2.

Figure 4:
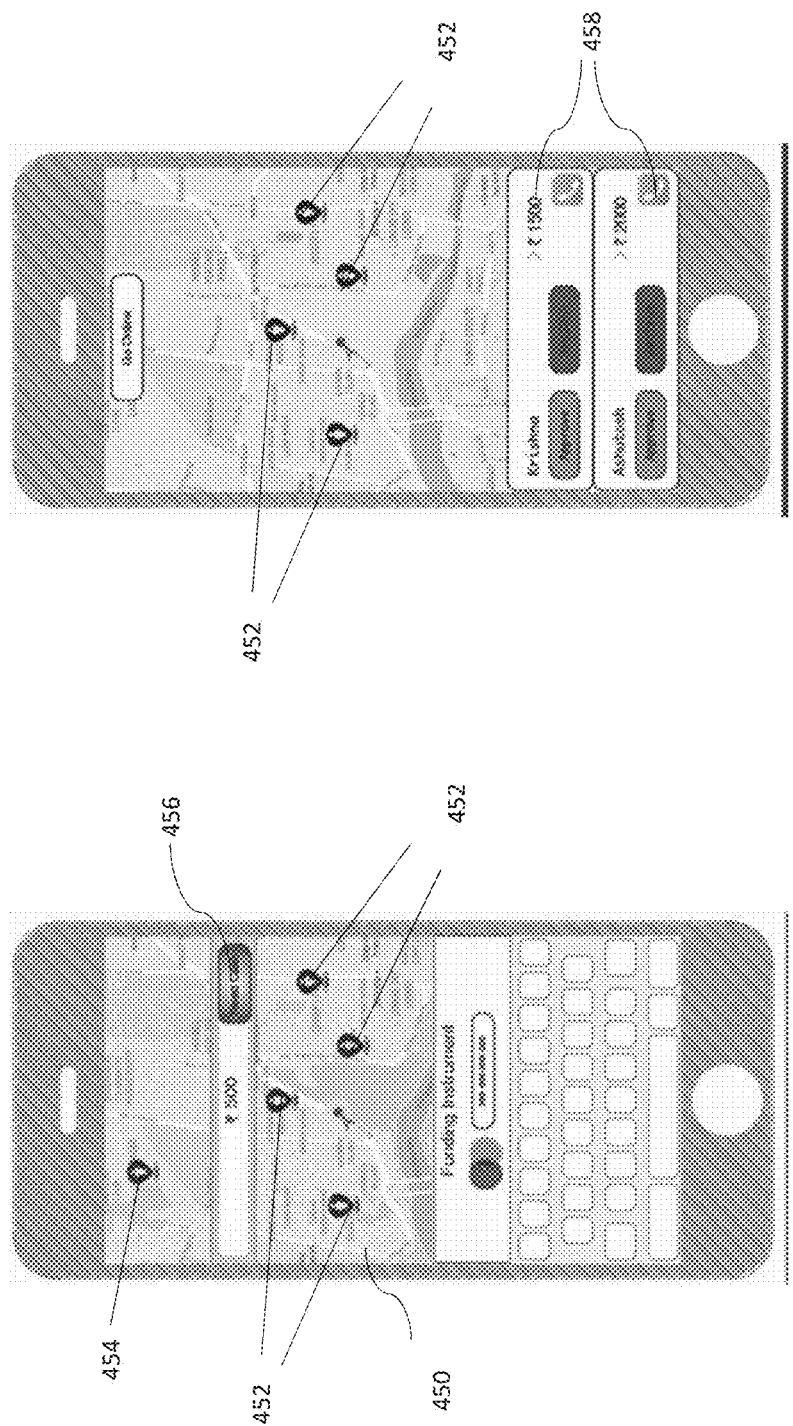
FIGS. 4A and 4B each show a geographical map layout that a user experiences when seeking to discover deals for fund offer, fund acceptance or both.

FIG. 4A shows a geographical map layout 450 that a user experiences when seeking to discover deals for fund offer, fund acceptance or both. This graphical map layout 450 is displayed, for example, when the user selects the Requests 124 option, as described above with respect to FIG. 2. Providing the location of users who have registered a deal for a fund offer, fund acceptance or both on a graphical map layout 450 is an alternative to providing the same information in text form, as shown in FIG. 2.

In the example, shown in FIG. 4A, the user enters a request that they need cash 456, i.e. the user becomes a purchaser. The offer-and-acceptance matching server 102 interrogates its database and responds to the request by showing on the graphical map layout 450 that sellers 452 and seller 454 have registered a fund offer deal for an amount that is at least of an amount that the user needs (in this case 500).

In the example shown in FIG. 4B, the user filters the results by stating that the fund offer deals must be within a distance of (for example) 700 m from the user's location. This causes the offer-and-acceptance matching server 102 to eliminate the seller 454, when compared to the results returned in FIG. 4A. The offer-and-acceptance matching server 102 also overlays options 458 to contact the sellers, whereby clicking on one of the options 458 initiates a sequence where the seller is notified, the generation of an authentication code to verify the identities of the seller and the purchaser, along with exchanging the contact details of both the seller and the buyer.

It will be appreciated that the offer-and-acceptance matching server 102 is also further configured to match deals for fund offer and fund acceptance when both are in different currencies. For instance, a user may wish to use the service provided by the offer-and-acceptance matching server 102 to determine whether there are fund offer deals for an overseas currency that the user is willing to pay using their bank account having local currency funds. This scenario occurs, for example, when the user wishes to go overseas, but a money changer has run out of money in the desired overseas currency. Alternatively, a tourist may use the offer-and-acceptance matching server 102 to obtain money in a local currency and is willing to fund the purchase from his bank account in his home country. In such a configuration, the offer-and-acceptance matching server 102 is configured to provide an option to select a currency of the deal for the fund offer or the fund acceptance. In this further configuration, the offer-and-acceptance matching server 102 provides further data field entries into the pages 219 and 224 that allow for a currency to be specified. Upon detecting that the currency indicated is different from the currency of the linked fund account, the offer-and-acceptance matching server 102 obtains a conversion rate between the two currencies from, for example, exchange rates hosted in a website. The obtained conversion rate is applied, whereby the cost of the deal in the currency of the linked fund account is shown to the user, factoring in the discount (in the case of the page 219) or the fee (in the case of the page 224), with a notification that the final cost may will depend on the prevailing exchange rate at the time of deal conclusion. During the deal acceptance phase described in FIG. 3, the offer-and-acceptance matching server 102 obtains the prevailing exchange rate which is applied to determine (in the case of the page 219) the amount debited from the purchaser's linked fund account in its currency; or (in the case of the page 224) the amount credited into the seller's linked fund account in its currency.

Figure 5:
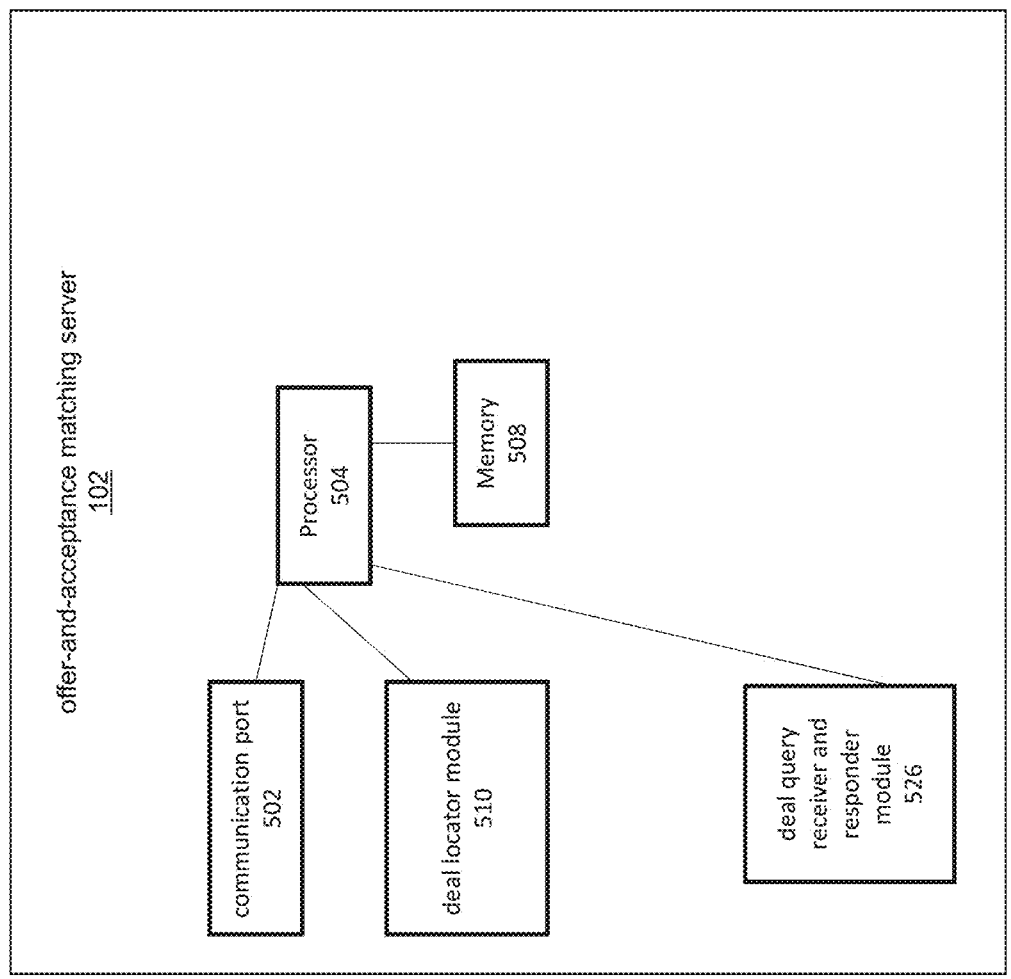
FIG. 5 provides a schematic diagram of functional modules present in the offer-and-acceptance matching server of FIGS. 1, 2 and 3.

FIG. 5 provides a schematic diagram of functional modules present in the offer-and-acceptance matching server 102 of FIGS. 1, 2 and 3.

The offer-and-acceptance matching server 102 includes a processor 504 and a memory 508. The offer-and-acceptance matching server 102 further includes, a communication port 502, a deal locator module 510 and a deal query and responder module 526.

Each of the memory 508, the communication port 502, the deal locator module 510 and the deal query and responder module 526 is coupled to the processor 504, so that their respective operations can be controlled by the processor 504. The memory 508 stores computer program code that the processor 504 compiles to have each of the communication port 502, the deal locator module 510 and the deal query and responder module 526 perform their respective functions.

Each of the communication port 502, the deal locator module 510 and the deal query and responder module 526 can be implemented using one or more processors present in the offer-and-acceptance matching server 102.

With reference to FIGS. 1 to 3, the communication port 502 of the offer-and-acceptance matching server 102 is configured to receive input, such as the query 204, authentication code from the consenter or a party who has registered a deal with the offer-and-acceptance matching server 102, information on registered fund offer or fund acceptance deals; and transmit data, such as a response to the query 204, generated authentication code, commands that interrogate databases where fund offer and/or fund acceptance deals are stored and effect payment between bank accounts.

The deal locator module 510 is configured to process the query 204 to determine parameters that define the type of fund offer and/or fund acceptance deals that are to be retrieved, such as deals that are within a provided distance or that charge a commission level below a defined threshold.

The deal query and responder module 526 is configured to recognise data received from the communication port 502 that is related to querying for registered fund offer and/or fund acceptance deals and route such data to the deal locator module 510. The deal query and responder module 526 also routes retrieved results from the interrogated databases that relate to the query to the communication port 502 for transmission.

Figure 6:
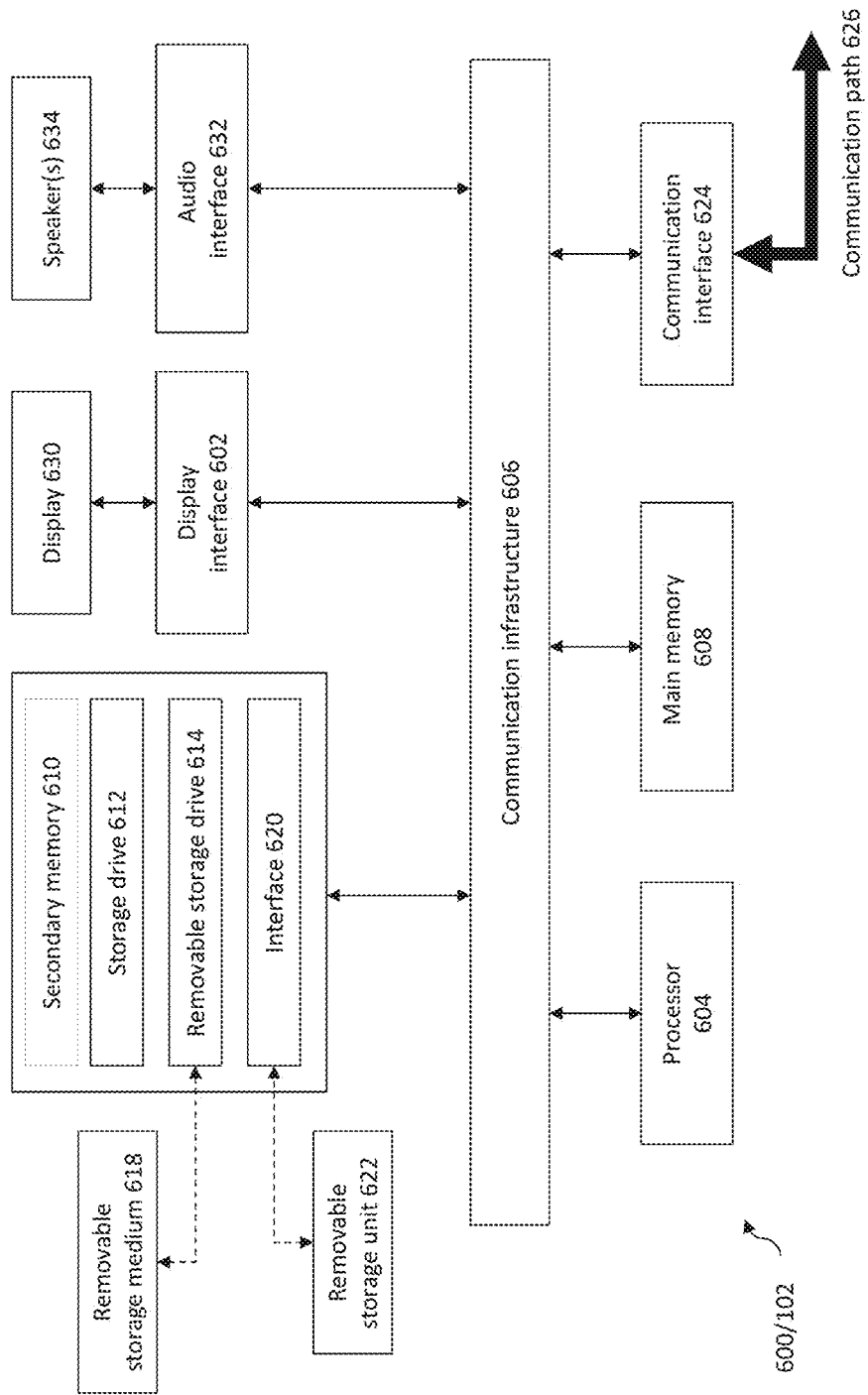
FIG. 6 shows a schematic of a computing device used to realise the offer-and-acceptance matching server shown in FIGS. 1 to 3 and 5.

FIG. 6 depicts an exemplary computing device 600, hereinafter interchangeably referred to as a computer system 600, where one or more such computing devices 600 may be used to implement the offer-and-acceptance matching server 102 shown in FIGS. 1, 2, 3 and 5. The following description of the computing device 600 is provided by way of example only and is not intended to be limiting.

As shown in FIG. 6, the example computing device 600 includes a processor 604 for executing software routines. Although a single processor is shown for the sake of clarity, the computing device 600 may also include a multi-processor system. The processor 604 is connected to a communication infrastructure 606 for communication with other components of the computing device 600. The communication infrastructure 606 may include, for example, a communications bus, cross-bar, or network.

The computing device 600 further includes a main memory 608, such as a random access memory (RAM), and a secondary memory 610. The secondary memory 610 may include, for example, a storage drive 612, which may be a hard disk drive, a solid state drive or a hybrid drive and/or a removable storage drive 614, which may include a magnetic tape drive, an optical disk drive, a solid state storage drive (such as a USB flash drive, a flash memory device, a solid state drive or a memory card), or the like. The removable storage drive 614 reads from and/or writes to a removable storage medium 618 in a well-known manner. The removable storage medium 618 may include magnetic tape, optical disk, non-volatile memory storage medium, or the like, which is read by and written to by removable storage drive 614. As will be appreciated by persons skilled in the relevant art(s), the removable storage medium 618 includes a computer readable storage medium having stored therein computer executable program code instructions and/or data.

In an alternative implementation, the secondary memory 610 may additionally or alternatively include other similar means for allowing computer programs or other instructions to be loaded into the computing device 600. Such means can include, for example, a removable storage unit 622 and an interface 620. Examples of a removable storage unit 622 and interface 620 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 622 and interfaces 620 which allow software and data to be transferred from the removable storage unit 622 to the computer system 600.

The computing device 600 also includes at least one communication interface 624. The communication interface 624 allows software and data to be transferred between computing device 600 and external devices via a communication path 626. In various embodiments of the inventions, the communication interface 624 permits data to be transferred between the computing device 600 and a data communication network, such as a public data or private data communication network. The communication interface 624 may be used to exchange data between different computing devices 600 which such computing devices 600 form part an interconnected computer network. Examples of a communication interface 624 can include a modem, a network interface (such as an Ethernet card), a communication port (such as a serial, parallel, printer, GPIB, IEEE 1394, RJ45, USB), an antenna with associated circuitry and the like. The communication interface 624 may be wired or may be wireless. Software and data transferred via the communication interface 624 are in the form of signals which can be electronic, electromagnetic, optical or other signals capable of being received by communication interface 624. These signals are provided to the communication interface via the communication path 626.

As shown in FIG. 6, the computing device 600 further includes a display interface 602 which performs operations for rendering images to an associated display 630 and an audio interface 632 for performing operations for playing audio content via associated speaker(s) 634.

As used herein, the term "computer program product" may refer, in part, to removable storage medium 644, removable storage unit 622, a hard disk installed in storage drive 612, or a carrier wave carrying software over communication path 626 (wireless link or cable) to communication interface 624. Computer readable storage media refers to any non-transitory, non-volatile tangible storage medium that provides recorded instructions and/or data to the computing device 600 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 600. Examples of transitory or non-tangible computer readable transmission media that may also participate in the provision of software, application programs, instructions and/or data to the computing device 600 include radio or infra-red transmission channels as well as a network connection to another computer or networked device, and the Internet or Intranets including e-mail transmissions and information recorded on Websites and the like.

The computer programs (also called computer program code) are stored in main memory 608 and/or secondary memory 610. Computer programs can also be received via the communication interface 624. Such computer programs, when executed, enable the computing device 600 to perform one or more features of embodiments discussed herein. In various embodiments, the computer programs, when executed, enable the processor 604 to perform features of the above-described embodiments. Accordingly, such computer programs represent controllers of the computer system 600.

Software may be stored in a computer program product and loaded into the computing device 600 using the removable storage drive 614, the storage drive 612, or the interface 620. The computer program product may be a non-transitory computer readable medium. Alternatively, the computer program product may be downloaded to the computer system 600 over the communications path 626. The software, when executed by the processor 604, causes the computing device 600 to perform functions of embodiments described herein.

It is to be understood that the embodiment of FIG. 6 is presented merely by way of example. Therefore, in some embodiments one or more features of the computing device 600 may be omitted. Also, in some embodiments, one or more features of the computing device 600 may be combined together. Additionally, in some embodiments, one or more features of the computing device 600 may be split into one or more component parts. The main memory 608 and/or the secondary memory 610 may serve(s) as the memory for the offer-and-acceptance matching server 102; while the processor 604 may serve as the processor of the offer-and-acceptance matching server 102.

In the case of FIGS. 1, 2, 3 and 5, the memory (610, 618) contains computer program code, where the memory (610, 618) and the computer program code are configured to, with the processor 604, cause the computing device 600 to receive, through the communication port (via the communication interface 624), a query to determine deals for fund offer, fund acceptance, or both, available within a provided distance; interrogate a database to determine one or more fund offer deals, one or more fund acceptance deals, or both that match the query, the database containing records of such deals registered with the database; and respond, through the communication port, to the query with the deals that are within the provided distance. The database is provided, for example, by any one or more of the memory 610, 618.

The computing device 600 is further configured to receive, through the communication port, an indication of a deal selected by a consenter from the deals retrieved in the response; transmit, through the communication port, a notification of the selection to a party who registered the selected deal.

The computing device 600 is further configured to transmit, through the communication port, a generated authentication code to either the consenter or the party who registered the selected deal; receive, through the communication port, an authentication code from the other of the consenter or the party who registered the selected deal; compare the received authentication code against the generated authentication code for a match; and transmit, in the event of a match, a command through the communication port to effect cash flow, of an amount stipulated in the selected deal, between a fund account linked to the consenter and a fund account linked to the party who registered the selected deal.

In one implementation, the generated communication code is only transmitted to a party offering the funds in the selected deal and wherein the authentication code is received from a party accepting the funds in the selected deal. The generated authentication code and the notification of the selection are simultaneously transmitted. The effected cash flow includes a commission applied on the selected deal.

The computing device 600 is further configured to: either: provide, through the communication port, the consenter with contact details of the party who registered the selected deal; provide, through the communication port, the party who registered the selected deal with contact details of the consenter; or both.

The computing device 600 is further configured to provide the contact details in a transmission format comprising any one or more of an application specific format, short message service (SMS) or email.

The computing device 600 is further configured to receive a request to register a fund acceptance deal or a fund offer deal with the database; detect for presence of at least a stipulated amount and a commission for acceptance of the deal; and register the deal with the database in response to affirmative detection of the fund amount and the commission figure.

In another implementation, the memory (610, 618) and the computer program code are configured to, with the processor 604, cause the computing device 600 to receive, through the communication port (via the communication interface 624), a receive, through the communication port, a query to determine deals for fund offer, fund acceptance, or both; interrogate a database to determine one or more fund offer deals, one or more fund acceptance deals, or both that match the query, the database containing records of such deals registered with the database; respond, through the communication port, to the query with the deals that match the query; receive, through the communication port, an indication of a deal selected by a consenter from the deals retrieved in the response; transmit, through the communication port, a notification of the selection to a party who registered the selected deal; transmit, through the communication port, a generated authentication code to either the consenter or the party who registered the selected deal; receive, through the communication port, an authentication code from the other of the consenter or the party who registered the selected deal; compare the received authentication code against the generated authentication code for a match; and transmit, in the event of a match, a command through the communication port to effect cash flow, of an amount stipulated in the selected deal, between a fund account linked to the consenter and a fund account linked to the party who registered the selected deal. The database is provided, for example, by any one or more of the memory 610, 618.

In yet another implementation, the memory (610, 618) contains computer program code, where the memory (610, 618) and the computer program code are configured to, with the processor 604, cause the computing device 600 to receive, through the communication port (via the communication interface 624), a request to register a fund acceptance deal or a fund offer deal; detect for presence of at least a stipulated amount and a commission for acceptance of the deal; register the deal with a database in response to affirmative detection of the fund amount and the commission figure; receive, through the communication port, a query to determine deals for fund offer, fund acceptance, or both; interrogate the database to determine the registered fund offer deal, the registered fund acceptance deal, or both that match the query; respond, through the communication port, to the query with the deals that match the query; and receive, through the communication port, an indication of a deal selected by a consenter from the deals retrieved in the response. The database is provided, for example, by any one or more of the memory 610, 618.

Figure 7:
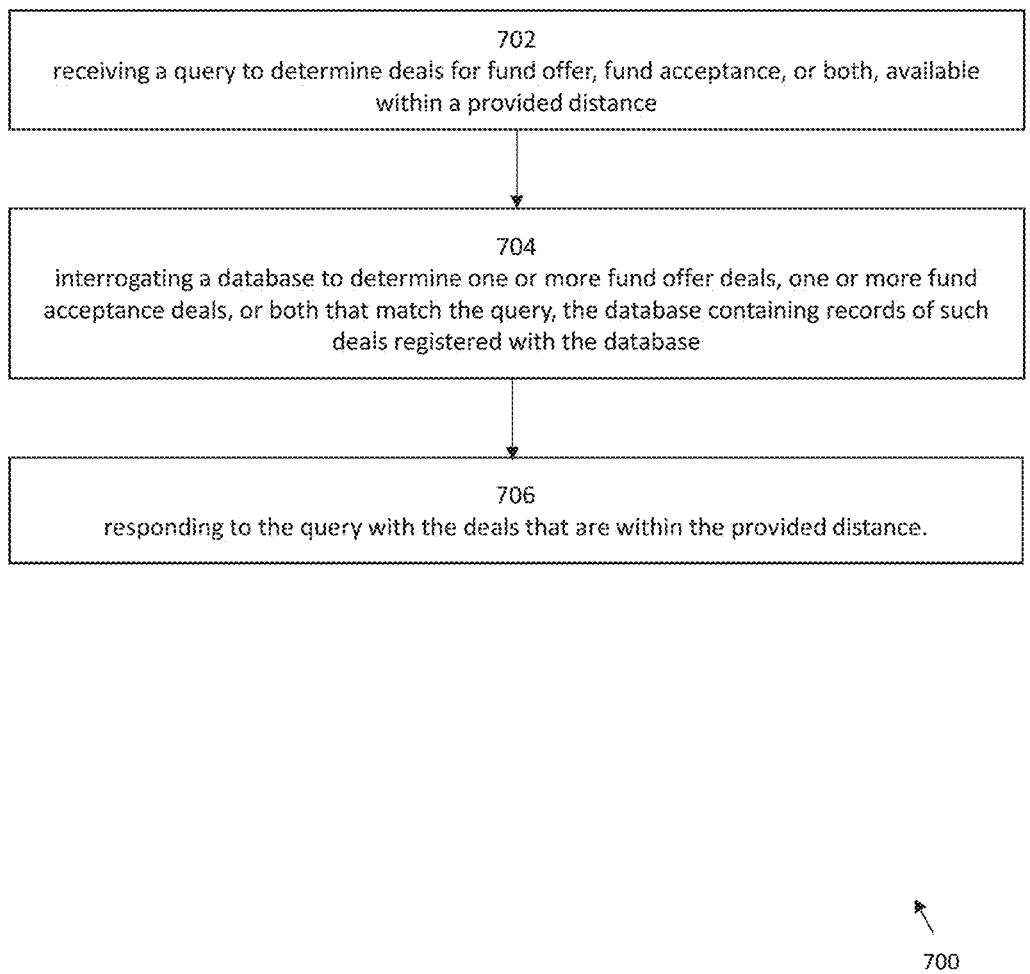
FIGS. 7 to 9 each show a flowchart depicting steps for matching offer and acceptance deals according to a respective approach.

FIG. 7 shows a flowchart depicting steps of an offer-and-acceptance matching method 700. The method 700 is performed by the computing device 600 of FIG. 6.

The method 700 includes a first step 702 of receiving a query to determine deals for fund offer, fund acceptance, or both, available within a provided distance.

A second step 704 involves interrogating a database to determine one or more fund offer deals, one or more fund acceptance deals, or both that match the query, the database containing records of such deals registered with the database.

A third step 706 involves responding to the query with the deals that are within the provided distance.

Figure 8:
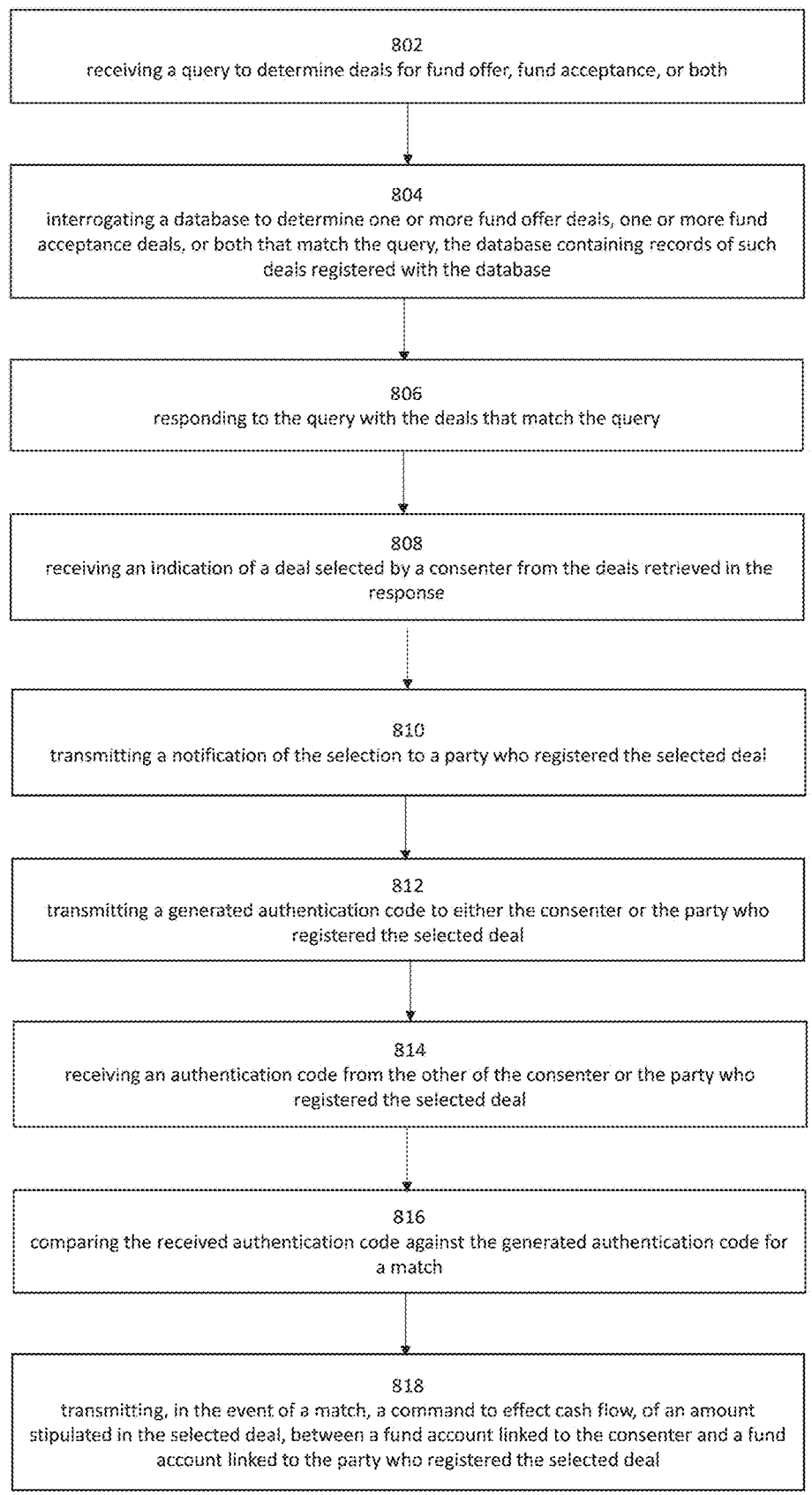

FIG. 8 shows a flowchart depicting steps of an offer-and-acceptance matching method 800. The method 800 is performed by the computing device 600 of FIG. 6.

The method 800 includes a first step 802 of receiving a query to determine deals for fund offer, fund acceptance, or both.

A second step 804 involves interrogating a database to determine one or more fund offer deals, one or more fund acceptance deals, or both that match the query, the database containing records of such deals registered with the database.

A third step 806 involves responding to the query with the deals that match the query.

A fourth step 808 involves receiving an indication of a deal selected by a consenter from the deals retrieved in the response.

A fifth step 810 involves transmitting a notification of the selection to a party who registered the selected deal.

A sixth step 812 involves transmitting a generated authentication code to either the consenter or the party who registered the selected deal.

A seventh step 814 involves receiving an authentication code from the other of the consenter or the party who registered the selected deal.

An eight step 816 involves comparing the received authentication code against the generated authentication code for a match.

A ninth step 818 involves transmitting, in the event of a match, a command to effect cash flow, of an amount stipulated in the selected deal, between a fund account linked to the consenter and a fund account linked to the party who registered the selected deal.

Figure 9:
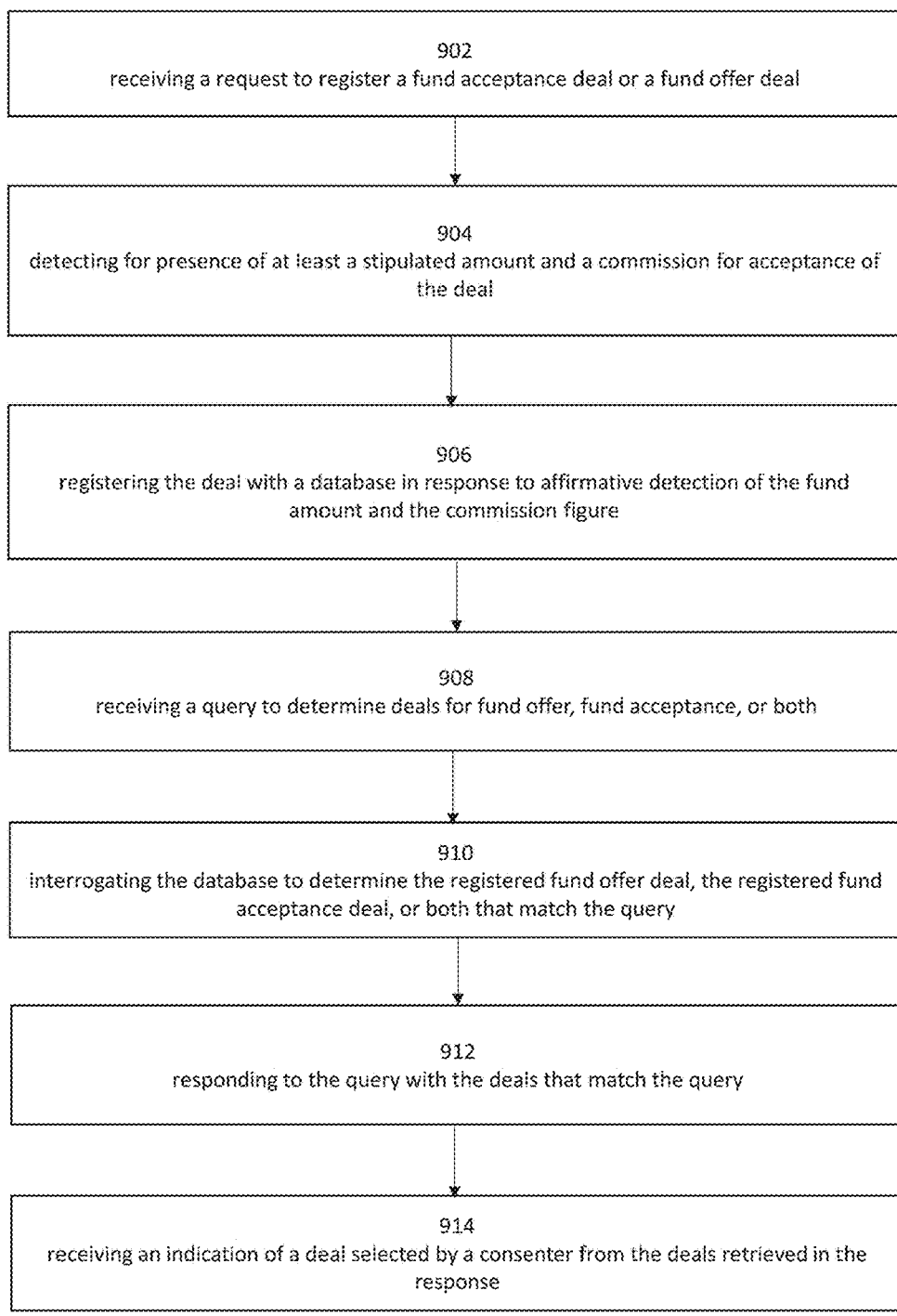

FIG. 9 shows a flowchart depicting steps of an offer-and-acceptance matching method 900. The method 900 is performed by the computing device 600 of FIG. 6.

The method 900 includes a first step 902 of receiving a request to register a fund acceptance deal or a fund offer deal.

A second step 904 involves detecting for presence of at least a stipulated amount and a commission for acceptance of the deal.

A third step 906 involves registering the deal with a database in response to affirmative detection of the fund amount and the commission figure.

A fourth step 908 involves receiving a query to determine deals for fund offer, fund acceptance, or both.

A fifth step 910 involves interrogating the database to determine the registered fund offer deal, the registered fund acceptance deal, or both that match the query.

A sixth step 912 involves responding to the query with the deals that match the query.

A seventh step 9176 involves receiving an indication of a deal selected by a consenter from the deals retrieved in the response.

Some portions of the above description are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on a computer effectively results in an apparatus that implements the steps of the preferred method.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An offer-and-acceptance matching server comprising:
   at least one processor;
   at least one memory including computer program code and a database, wherein the database contains records of a plurality of fund offer deals and a plurality of fund acceptance deals, wherein a fund offer deal indicates a registered request to provide cash and a fund acceptance deal indicates a registered request for required cash; and
   a communication port coupled to the at least one processor, wherein the at least one memory and the computer program code are configured to, with the at least one processor, cause the offer-and-acceptance matching server at least to:
   receive from a consenter, through the communication port, a query to determine deals for fund offer, fund acceptance, or both, available within a provided distance from a physical location of the consenter;
   in response to receiving the query:
       obtain the physical location of the consenter via a global positioning system (GPS) capability of a computing device of the consenter;
       interrogate the database to determine one or more fund offer deals, one or more fund acceptance deals, or both that match the query;
       identify locations of parties associated with the one or more fund offer deals, one or more fund acceptance deals, or both that match the query based on the locations of the parties captured via a GPS capability; and
       respond, through the communication port, to the query with the deals and corresponding locations of the parties that are within the provided distance from the physical location of the consenter for surfacing the deals on a map according to the locations of the parties who registered the deals;

receive, through the communication port, an indication of a selected deal selected by the consenter from the deals communicated in the response;

transmit, through the communication port, a notification of the selection of the selected deal to a party who registered the selected deal;

transmit, through the communication port, a generated authentication code to either the consenter or the party who registered the selected deal;

receive, through the communication port, an authentication code from the other of the consenter or the party who registered the selected deal;

compare the received authentication code against the generated authentication code for a match; and transmit, in an event of a match of authentication codes, a command through the communication port to perform a fund transfer of an amount stipulated in the selected deal, wherein the fund transfer is from a fund account linked to the consenter to a fund account linked to the party who registered the selected deal in a case of a fund offer deal, and wherein the fund transfer is from the fund account linked to the party who registered the selected deal to the fund account linked to the consenter in a case of a fund acceptance deal.

2. The offer-and-acceptance matching server of claim 1, wherein the generated authentication code is only transmitted to a party offering the funds in the selected deal and wherein the authentication code is received from a party accepting the funds in the selected deal.

3. The offer-and-acceptance matching server of claim 1, wherein the generated authentication code and the notification of the selection are simultaneously transmitted.

4. The offer-and-acceptance matching server of claim 1, wherein the fund transfer includes a commission applied on the selected deal.

5. The offer-and-acceptance matching server of claim 1, wherein the offer-and-acceptance matching server is further configured to:
provide, through the communication port, the consenter with contact details of the party who registered the selected deal; or
provide, through the communication port, the party who registered the selected deal with contact details of the consenter; or
both.

6. The offer-and-acceptance matching server of claim 5, wherein the offer-and-acceptance matching server is further configured to provide the contact details in a transmission format comprising any one or more of an application specific format, short message service (SMS) or email.

7. The offer-and-acceptance matching server of claim 1, wherein the offer-and-acceptance matching server is further configured to:
receive a request to register a fund acceptance deal or a fund offer deal with the database;
detect for a presence of at least a stipulated fund amount and a commission figure for acceptance of the deal; and
register the deal with the database in response to affirmative detection of the stipulated fund amount and the commission figure.

8. An offer-and-acceptance matching server comprising:
at least one processor;
at least one memory including computer program code and a database, wherein the database contains records of a plurality of fund offer deals and a plurality of fund acceptance deals; and
a communication port coupled to the at least one processor;
the at least one memory and the computer program code configured to, with the at least one processor, cause the offer-and-acceptance matching server at least to:
receive a request to register a fund acceptance deal comprising a stipulated fund amount and a commission figure for acceptance of the fund acceptance deal, wherein the fund acceptance deal indicates a request for required cash;
detect for a presence of at least the stipulated fund amount and the commission figure for acceptance of the fund acceptance deal;
obtain a first physical location via a global positioning system (GPS) capability of a computing device of a source of the request to register the fund acceptance deal;
register the fund acceptance deal as a registered fund acceptance deal with the database in response to affirmative detection of the stipulated fund amount and the commission figure for acceptance of the fund acceptance deal, the registered fund acceptance deal being included in the records of the plurality of fund acceptance deals in the database;
receive a request to register a fund offer deal comprising a stipulated fund amount and a commission figure for acceptance of the fund offer deal, wherein the fund offer deal indicates a request to provide cash;
detect for presence of at least the stipulated fund amount and the commission figure for acceptance of the fund offer deal;
obtain a second physical location via a GPS capability of a computing device of a source of the request to register the fund offer deal;
register the fund offer deal as a registered fund offer deal with the database in response to affirmative detection of the fund amount and the commission figure for acceptance of the fund offer deal, the registered fund offer deal being included in the records of the plurality of fund offer deals in the database;
receive from a consenter, through the communication port, a query to determine deals for fund offer, fund acceptance, or both;
obtain a third physical location via a GPS capability of a computing device of the consenter;
interrogate the database to determine at least one fund offer deal, at least one fund acceptance deal, or both that match the query;
identify physical locations of parties associated with the at least one fund offer deal, at least one fund acceptance deal, or both that match the query based on the physical locations of the parties captured via a GPS capability;
respond, through the communication port, to the query with the deals that match the query and corresponding physical locations of the parties that are within a particular distance from the third physical location of the consenter, wherein the deals that match the query include the registered fund offer deal, the registered fund acceptance deal, or both;
receive, through the communication port, an indication of a selected deal selected by a consenter from the deals retrieved in the response;

transmit, through the communication port, a notification of the selection of the selected deal to a party who registered the selected deal;

transmit, through the communication port, a generated authentication code to either the consenter or the party who registered the selected deal;

receive, through the communication port, an authentication code from the other of the consenter or the party who registered the selected deal;

compare the received authentication code against the generated authentication code for a match; and transmit, in an event of a match of authentication codes, a command through the communication port to perform a fund transfer of an amount stipulated in the selected deal, wherein the fund transfer is from a fund account linked to the consenter to a fund account linked to the party who registered the selected deal in a case of a fund offer deal, and wherein the fund transfer is from the fund account linked to the party who registered the selected deal to the fund account linked to the consenter in a case of a fund acceptance deal.

9. The offer-and-acceptance matching server of claim 8, wherein the offer-and-acceptance matching server is further configured to:

detect that a currency of the fund offer deals or the fund acceptance deals is different from a currency of a fund account linked to be debited for the fund acceptance deal or credited for the fund offer deal;

obtain an exchange rate between the currency of the fund offer deals or the fund acceptance deals and the currency of the linked fund account; and determine a cost of the fund offer deals or the fund acceptance deals in the currency of the linked fund account.

10. The offer-and-acceptance matching server of claim 8, wherein the offer-and-acceptance matching server is further configured to:

receive information of one or more bank accounts and mobile number of a user registering the fund acceptance deal or the fund offer deal; and obtain a location of the user registering the fund acceptance deal or the fund offer deal.

11. An offer-and-acceptance matching method comprising:

receiving, by a computing device, from a consenter a query to determine deals for fund offer, fund acceptance, or both, available within a provided distance from a physical location of the consenter, wherein a deal for a fund offer indicates a registered request to provide cash and a deal for a fund acceptance indicates a registered request for required cash;

obtaining, by the computing device, the physical location of the consenter via a global positioning system (GPS) capability of a computing device of the consenter;

interrogating, by the computing device, a database to determine one or more fund offer deals, one or more fund acceptance deals, or both that match the query, wherein the database contains records of the one or more fund offer deals and the one or more fund acceptance deals registered with the database;

identifying, by the computing device, locations of parties associated with the one or more fund offer deals, one or more fund acceptance deals, or both that match the query based on the locations of the parties captured via a GPS capability;

responding, by the computing device, to the query with the deals that match the query within the provided distance from the physical location of the consenter;

receiving, by the computing device, an indication of a deal selected by the consenter from the deals retrieved in the response;

transmitting, by the computing device, a notification of the selection to a party who registered the selected deal;

transmitting, by the computing device, a generated authentication code to either the consenter or the party who registered the selected deal;

receiving, by the computing device, an authentication code from the other of the consenter or the party who registered the selected deal;

comparing, by the computing device, the received authentication code against the generated authentication code for a match; and transmitting, by the computing device, in an event of a match, a command to perform a fund transfer of an amount stipulated in the selected deal, wherein the fund transfer is from a fund account linked to the consenter to a fund account linked to the party who registered the selected deal in a case of a fund offer deal, and wherein the fund transfer is from the fund account linked to the party who registered the selected deal to the fund account linked to the consenter in a case of a fund acceptance deal.

12. The method of claim 11, wherein the generated authentication code is only transmitted to a party offering the funds in the selected deal and wherein the authentication code is received from a party accepting the funds in the selected deal.

13. The method of claim 11, wherein the fund transfer includes a commission applied on the selected deal.

14. The method of claim 11, further comprising:

providing, by the computing device, the consenter with contact details of the party who registered the selected deal; or providing, by the computing device, the party who registered the selected deal with contact details of the consenter; or both.

15. The method of claim 11, further comprising:

receiving, by the computing device, a request to register a fund acceptance deal or a fund offer deal with the database;

detecting, by the computing device, for a presence of at least a stipulated fund amount and a commission figure for acceptance of the deal; and registering, by the computing device, the deal with the database in response to affirmative detection of the stipulated fund amount and the commission figure.

* * * * *